(12) United States Patent
Sahasrabudhe et al.

(10) Patent No.: US 7,716,228 B2
(45) Date of Patent: May 11, 2010

(54) CONTENT QUALITY APPARATUS, SYSTEMS, AND METHODS

(75) Inventors: Sadanand Sahasrabudhe, Gaithersburg, MD (US); Gaurav Rewari, Cupertino, CA (US); Binay Mohanty, Delhi (IN); Xiang Yu, Clarksville, MD (US)

(73) Assignee: FirstRain, Inc., San Mateo, CA (US)

( * ) Notice: Subject to any disclaimer, the term of this patent is extended or adjusted under 35 U.S.C. 154(b) by 373 days.

(21) Appl. No.: 11/861,141

(22) Filed: Sep. 25, 2007

(65) Prior Publication Data

US 2009/0083251 A1 Mar. 26, 2009

(51) Int. Cl.
*G06F 7/00* (2006.01)
*G06F 17/30* (2006.01)
(52) U.S. Cl. .................... 707/748; 707/754
(58) Field of Classification Search ............. 707/5, 707/4, 3, 101
See application file for complete search history.

(56) References Cited

U.S. PATENT DOCUMENTS

2006/0047647 A1* 3/2006 Kuboyama et al. .......... 707/4
2006/0161543 A1* 7/2006 Feng et al. .................. 707/5

\* cited by examiner

*Primary Examiner*—Charles Rones
*Assistant Examiner*—Fariborz Khoshnoodi
(74) *Attorney, Agent, or Firm*—Schwegman, Lundberg & Woessner, P.A.

(57) ABSTRACT

Embodiments herein receive a set of content quality threshold values, a search string, and a content data stream at a content quality metric (CQM) apparatus. Content segments associated with the content data stream are scored and/or graded according to a set of content relevance scales. The content data stream is then filtered to include only passing content segments and intermediate calculation values used to determine whether a content segment is passing. Other embodiments are described and claimed.

28 Claims, 12 Drawing Sheets

| CONTENT SOURCE CLASS IDENTIFIER 416 | CONTENT SOURCE IDENTIFIER 410 | MKT. ENTITY/ TOPIC IDENTIFIER 454 | RELEVANCE SCORE 426, 430 | RELEVANCE GRADE 420 | |
|---|---|---|---|---|---|
| MAJOR NEWS SOURCE | WALL STREET JOURNAL | GENERAL | 0.40 | A- | —446 |
| MAJOR NEWS SOURCE | SEATTLE TIMES | PLATFORM SOFTWARE | 0.37 | B+ | —442 |
| MAJOR NEWS SOURCE | SEATTLE TIMES | MICROSOFT | 0.38 | B+ | —436 |
| MAJOR NEWS SOURCE | SEATTLE TIMES | GENERAL | 0.32 | B | |
| MAJOR NEWS SOURCE | DEFAULT | GENERAL | 0.30 | B | |
| BLOGS | TECHCRUNCH | GENERAL | 0.85 | A | |

| CONTENT TYPE 510 | RELEVANCE SCORE 520 | RELEVANCE GRADE 530 |
|---|---|---|
| PRESS RELEASE | 0.25 | D |
| WIRE NEWS ARTICLE | 0.40 | C |
| ORIGINAL BYLINED ARTICLE | 0.65 | B |
| BLOG POSTING | 0.80 | A |

CONTENT QUALITY APPARATUS, SYSTEMS, AND METHODS

RELATED APPLICATIONS

This disclosure is related to pending U.S. patent application Ser. No. 11/844,796 titled "Content Identification and Classification Apparatus, Systems, and Methods," filed on Aug. 24, 2007 and to U.S. patent application Ser. No. 11/844,825 titled "Content Classification and Extraction Apparatus, Systems, and Methods," filed on Aug. 24, 2007, both assigned to the assignee of the embodiments disclosed herein, first Rain Inc., and are incorporated herein by reference in their entirety.

TECHNICAL FIELD

Various embodiments described herein relate to information access generally, including apparatus, systems, and methods associated with user-relevant information content extraction.

BACKGROUND

The term "market intelligence" refers generally to information that is relevant to a company's markets. Market intelligence may include information about competitors, customers, prospects, investment targets, products, people, industries, regulatory areas, events, and market themes that impact entire sets of companies.

Market intelligence may be gathered and analyzed by companies to support a range of strategic and operational decision-making. Market intelligence may, for example, include the identification of market opportunities and competitive threats as well as the definition of market penetration strategies and market development metrics. Market intelligence may also be gathered and analyzed by financial investors and/or by financial investment advisors to aid with investment decisions relating to securities and to market sectors.

With the explosion of the Internet as a means of reporting and disseminating information, the ability to obtain timely, relevant, hard-to-find market intelligence from the Worldwide Web ("Web") has become central to many market intelligence initiatives. This ability may be particularly important to financial services investment professionals because of government-mandated restrictions on the preferential sharing of information by company management. These issues have resulted in an increased interest in applying technology to provide differentiated data and insights from web-based sources in order to yield trading advantages for investors.

However, efforts to provide timely market intelligence from internet sources have been limited by the scale, complexity, diversity and dynamic nature of the Web and its information sources. The Web is vast, dynamically changing, noisy (containing irrelevant data), and chaotic. These characteristics may confound analytical methods that are successful with structured data and even methods that may be successfully with unstructured content found on enterprise intranets.

Unlike structured data in a database, web information tends not to conform to a fixed semantic structure or schema. As a result, such information may not readily lend itself to precise querying or to directed navigation. And unlike most unstructured content on corporate intranets, data on the Web may be far more vast and volatile, may be authored by a larger and more varied set of individuals as compared to structured data, may be published in a variety of media sources ranging from mainstream news agencies to highly specialized trade publications, and in general may contain less descriptive metadata (or tags) capable of exploitation for the purpose of retrieving and classifying information.

Existing approaches to internet search are generally designed to support a wide cross-section of users seeking content across the breadth of all human knowledge generally. Assumptions associated with existing approaches may include an assumption that nothing is known a priori about a user's interests and preferences beyond what can be concluded from the entered search string. These approaches may not support the specialized needs of market intelligence users.

Interests and preferences associated with market intelligence users may be different from those of the general populace, as previously mentioned, and may be known or acquired. For example, a financial services investment manager may be interested in a company's recent commercial success in the marketplace. From a typical consumer internet search engine the financial services manager may readily retrieve a list of major new "customer wins" announced in sources that are popular as measured by links to and from these sources. However, such a user may already routinely receive similar information from existing market data channels. The financial services manager may be particularly interested in new "customer wins" that have not been widely reported online because that information may provide a securities trading advantage.

Taking another example, a financial services manager examining a company's acquisition plans may be interested in receiving articles about actual or rumored acquisitions from obscure sources. Such sources should be credible, however, given the high level of incorrect or misleading information to be found on this topic. Such personalized relevance that may derive from existing knowledge about an end user's particular interests and preferences may not be obtainable from currently available internet search engines.

BRIEF DESCRIPTION OF THE DRAWINGS

FIG. 4 is a content diagram of a content source lookup table according to various example embodiments.

FIG. 5 is a content diagram of a content type lookup table according to various example embodiments.

DETAILED DESCRIPTION

Figure 1:
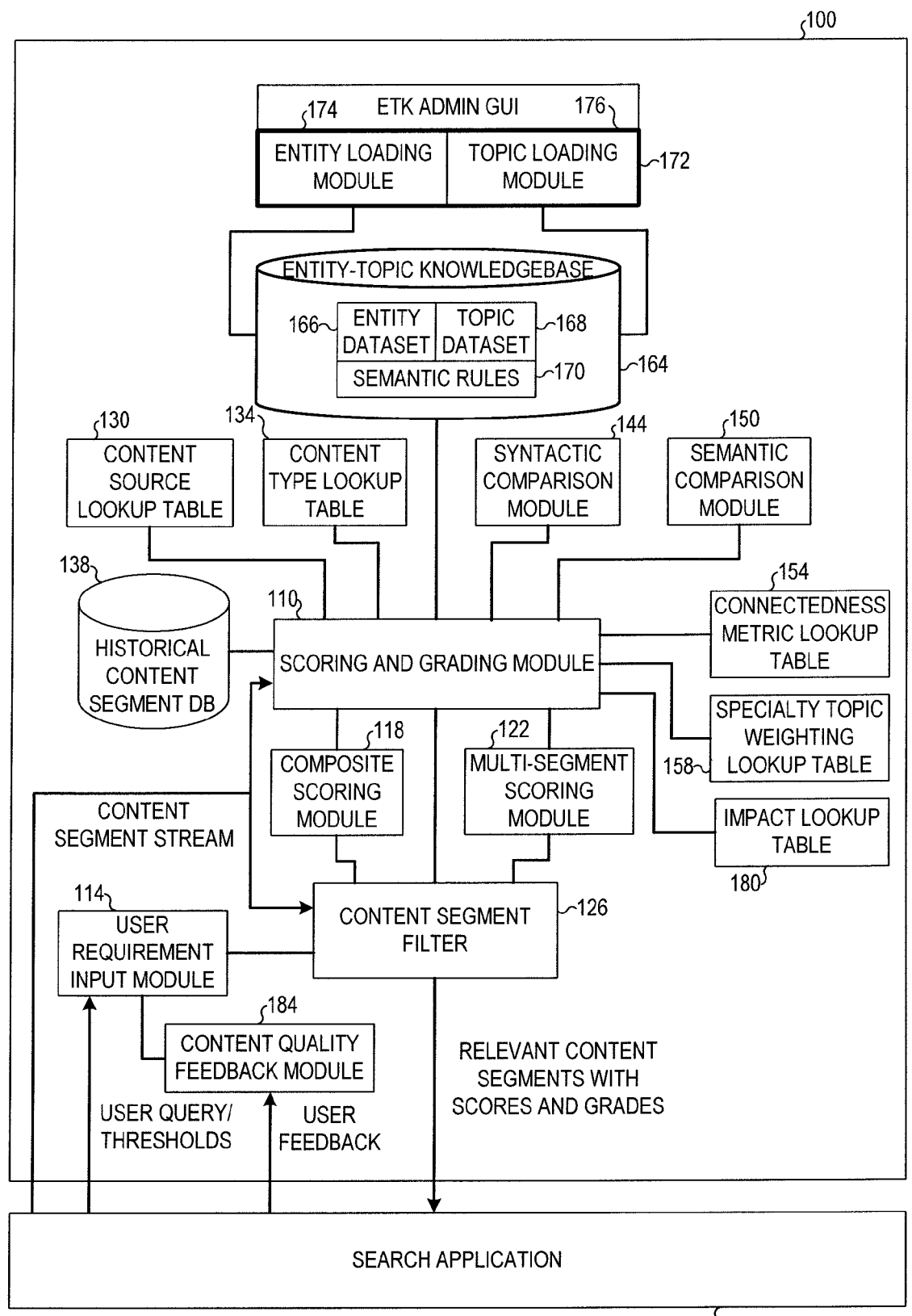
FIG. 1 is a block diagram of an apparatus and system according to various example embodiments.

FIG. 1 is a block diagram of an apparatus 100 and a system 190 according to various example embodiments. The information content acted upon by the various embodiments may comprise a set of content segments previously identified and categorized from an unstructured data stream. The apparatus, systems, and methods disclosed herein operate to assess the relevance of content segments retrieved for a consumer of market intelligence ("user") by scoring and grading the content segments according to a set of content relevance scales. Content relevance threshold levels may be set according to user requirements. Content segments meeting or exceeding the threshold levels may be forwarded to the user. Content segments scoring below the predefined threshold levels may be hidden from the user to prevent information overload.

Some embodiments herein may be described with reference to example users such as "investment managers" and "investment professionals." It is noted that the embodiments may be geared to various types of market intelligence users including investment managers, financial services professionals, retail investors, competitive intelligence analysts, marketing professionals, and sales professionals, among others and without limitation.

The apparatus 100 may include a scoring and grading module 110. The scoring and grading module 110 scores one or more of a set of content segments associated with a content data stream according to a set of scorable content relevance scales. One or more relevance scores and/or grades may be obtained thereby.

Figure 2:
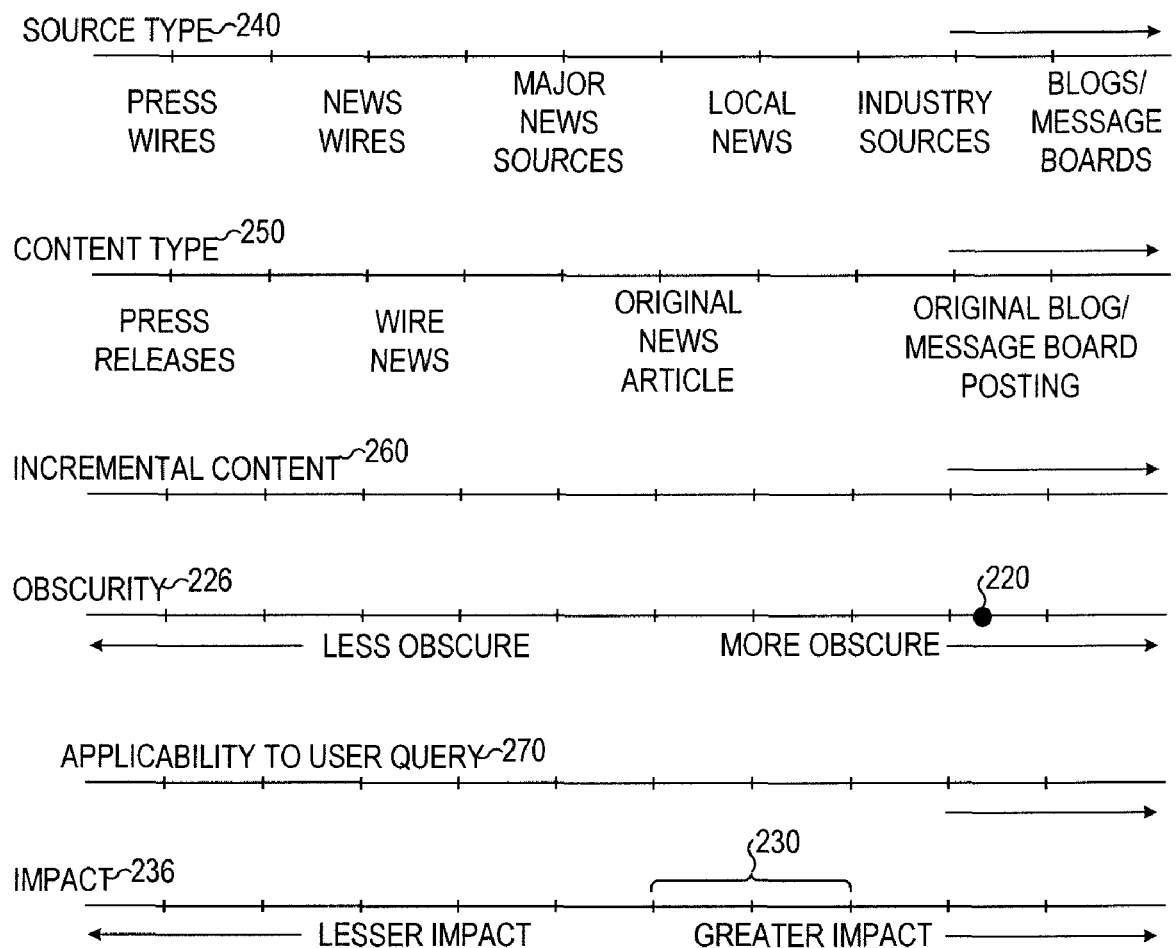
FIG. 2 is a diagram showing a set of content relevance scales according to various example embodiments.

FIG. 2 is a diagram showing a set of content relevance scales according to various example embodiments. Each relevance score may correspond to a numerical value at a point along an associated scorable relevance scale, with higher scores positioned on the right-hand end of the examples scales as shown in FIG. 2. For example, a content segment containing very obscure content may earn a high obscurity relevance score as represented by the point 220 on the high end of the obscurity relevance scale 226.

The scoring and grading module 110 may also grade one or more content segments according to a set of gradable content relevance scales, resulting in one or more relevance grades. Each relevance grade may correspond to a zone along an associated gradable relevance scale (e.g., the zone 230 associated with an impact scale 236). Structural elements associated with the storage and grading operations are explained in further detail below.

The obscurity relevance scale 226, the impact relevance scale 236, the source type relevance scale 240, the content type relevance scale 250, the incremental content relevance scale 260, and the applicability to user query relevance scale 270 are merely examples of many possible relevance scales. Some or all of the example relevance scales of FIG. 2 may be used in various embodiments. Some embodiments may use additional or different relevance scales.

Turning back to FIG. 1, the apparatus 100 may also include a user requirement input module 114 communicatively coupled to the scoring and grading module 110. The user requirement input module 114 accepts a search string, a set of quality content threshold values, or both. The search string may comprise a query statement used to identify and categorize the set of content segments to be scored and graded by the scoring and grading module 110. The set of quality content threshold values may be used by the apparatus 100 to prevent content segments that do not meet quality content threshold criteria from being presented to a user. The apparatus 100 also returns the resulting "passing" content segments along with scores, grades, and composite calculations used to determine whether a content segment is passing. These values enable a search application to rank, sort and present content segments returned in response to the search in a meaningful manner.

One or more mathematical functions may be performed on the set of relevance scores and/or on the set of relevance grades associated with each of the various relevance scales. Composite combinations of the relevance scores and composite combinations of the relevance grades may be obtained thereby. Likewise, one or more mathematical functions may be performed on the set of content quality threshold values associated with the various relevance scales and received at the user requirement input module 114. Mathematical functions applied to the relevance scores to the relevance grades, and/or to the content quality threshold values may comprise numerical functions, Boolean functions, or alphanumeric string comparison functions, among other function types.

Figure 3:
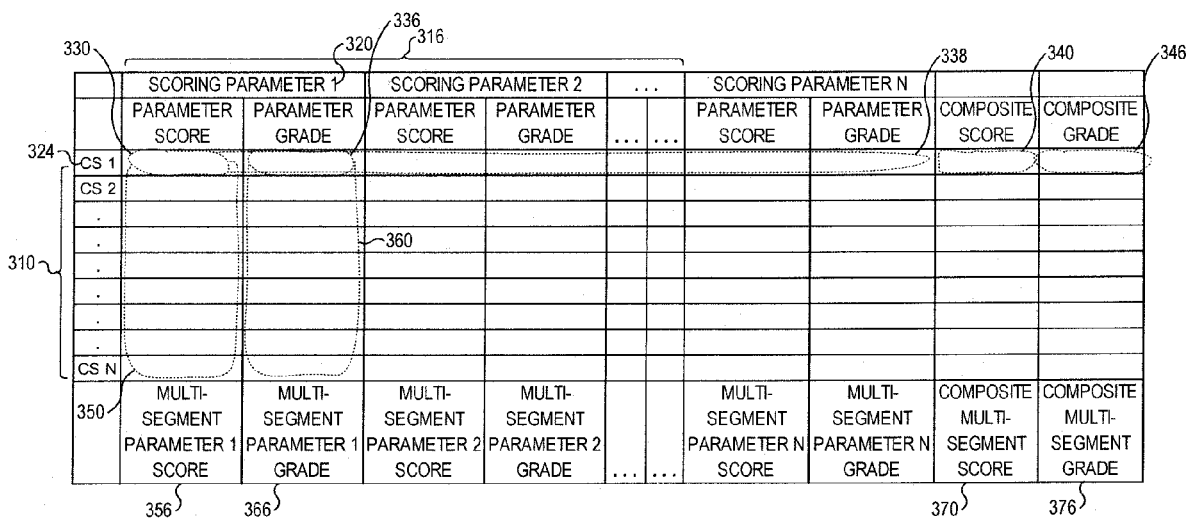
FIG. 3 is a numerical matrix showing relevance scores and grades across multiple content segments as a function of various content relevance scales according to various example embodiments.
Figure 6A:
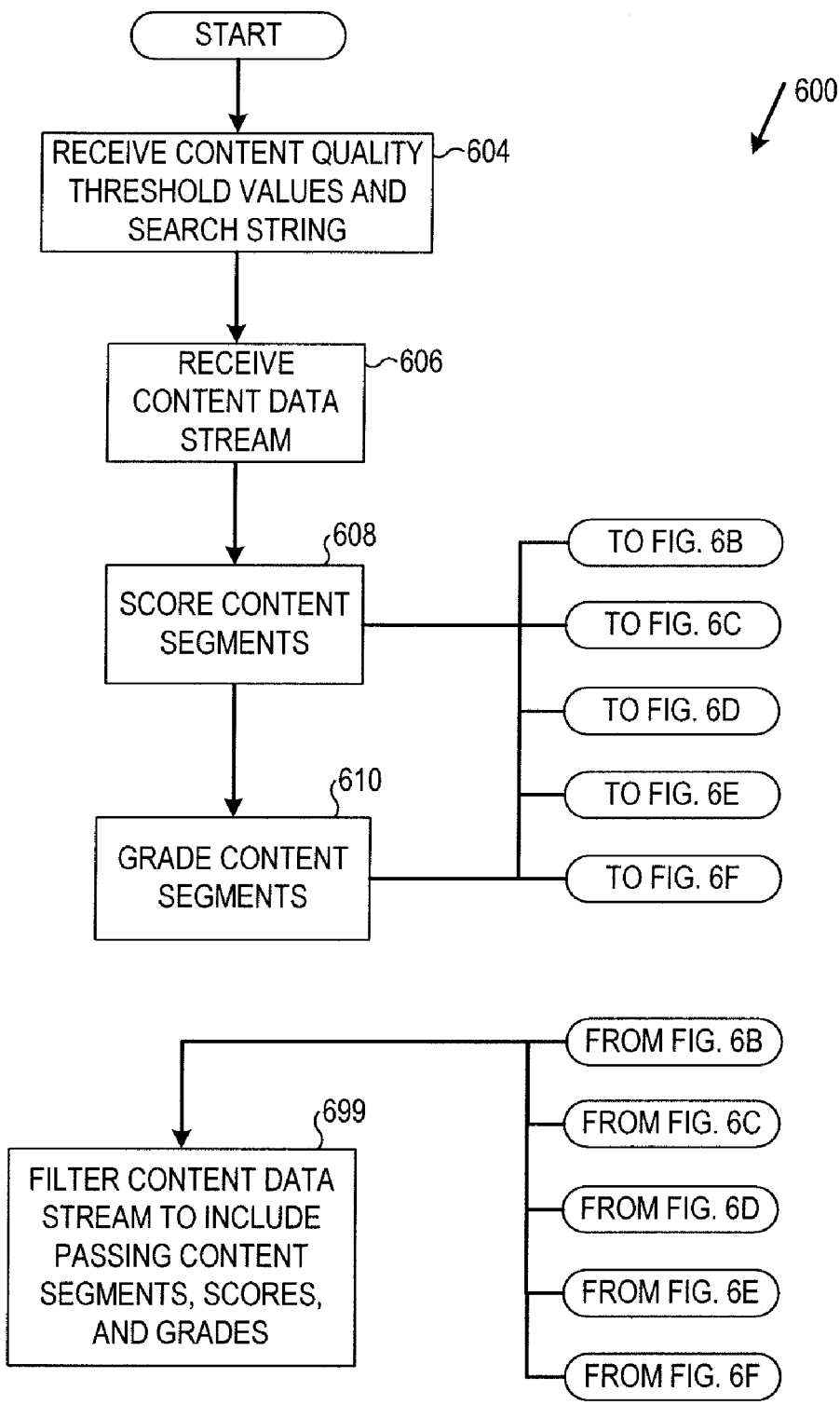
FIGS. 6A-6G are flow diagrams illustrating an example method according to various embodiments.
Figure 6B:
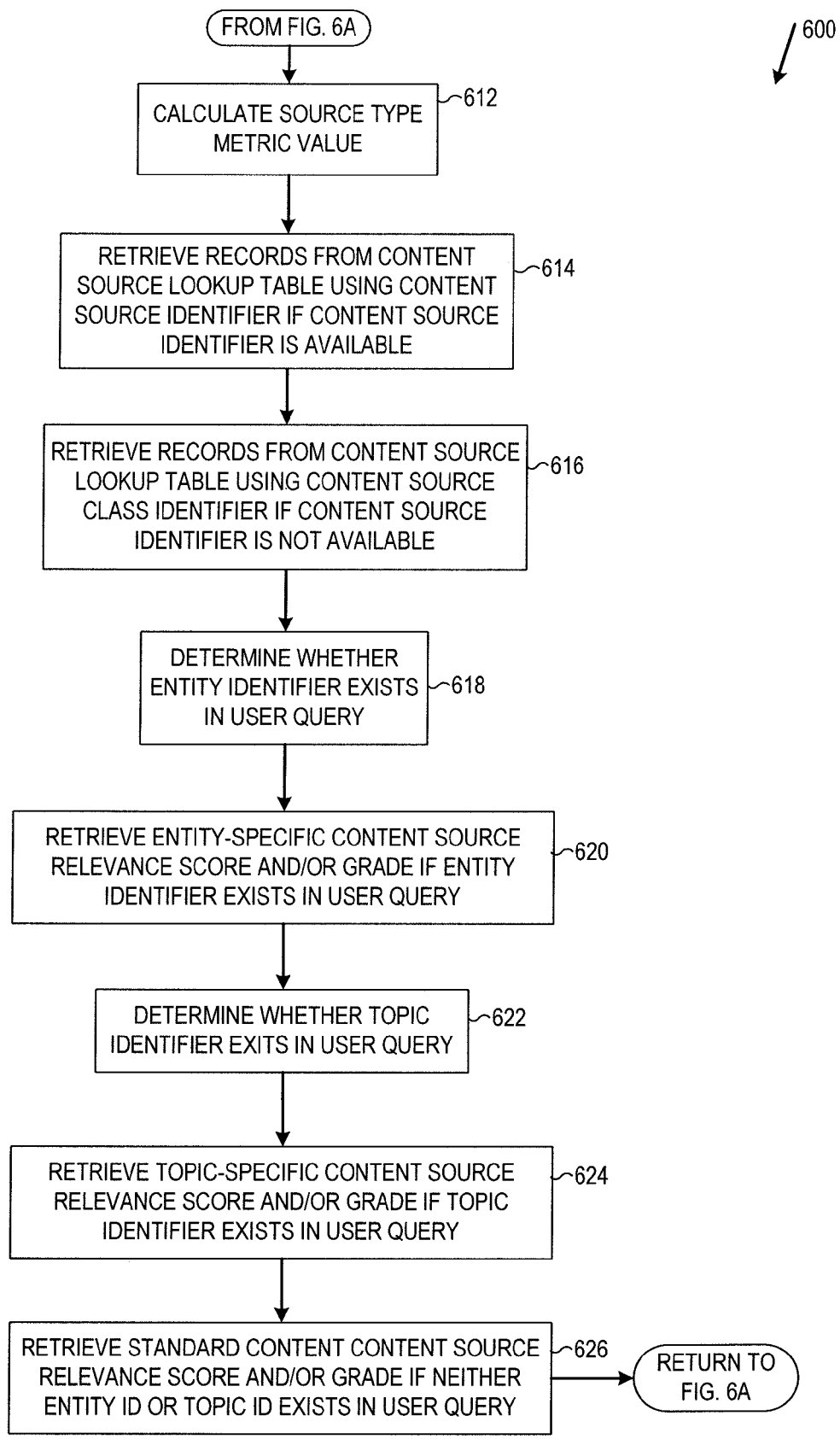
Figure 6C:
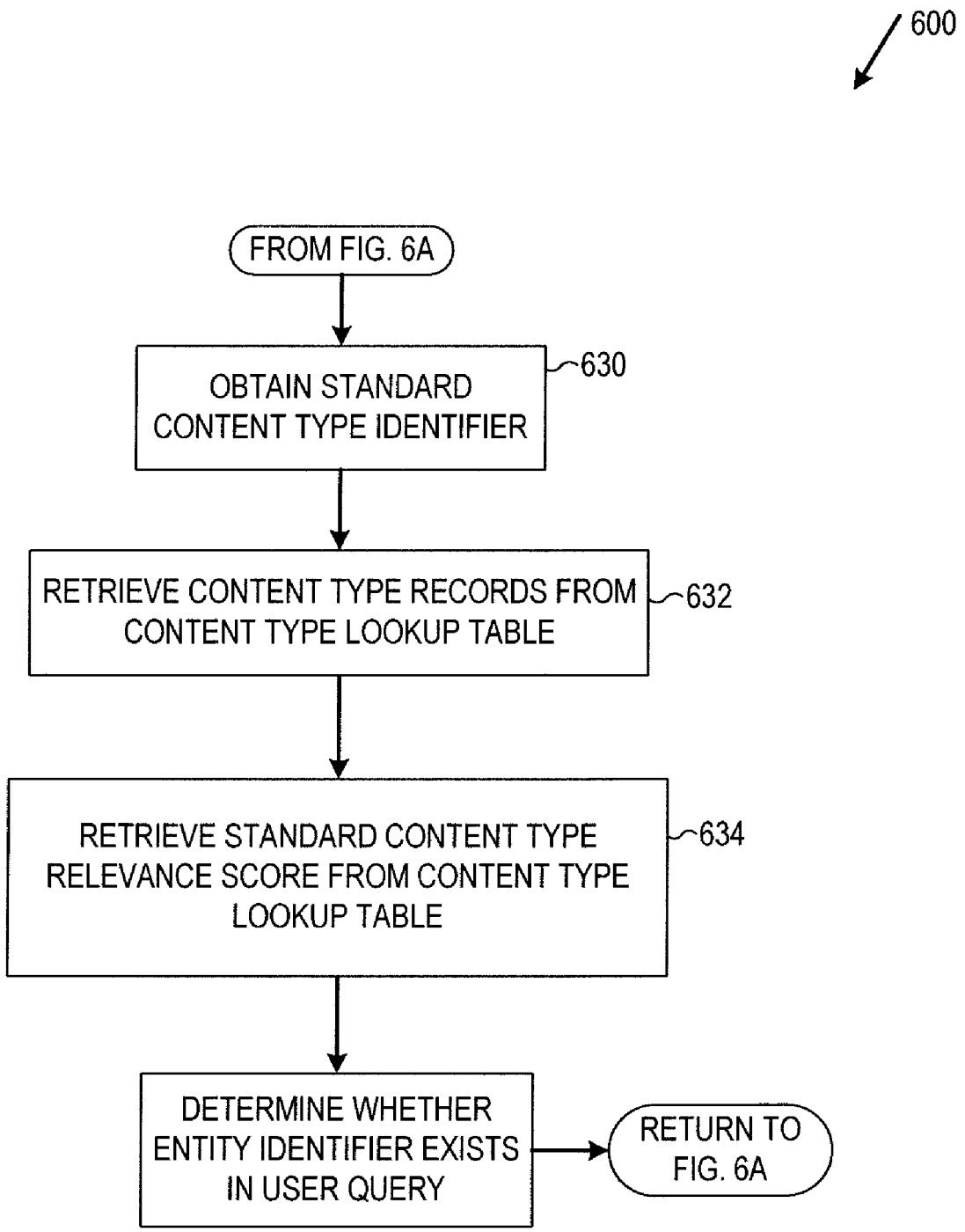
Figure 6D:
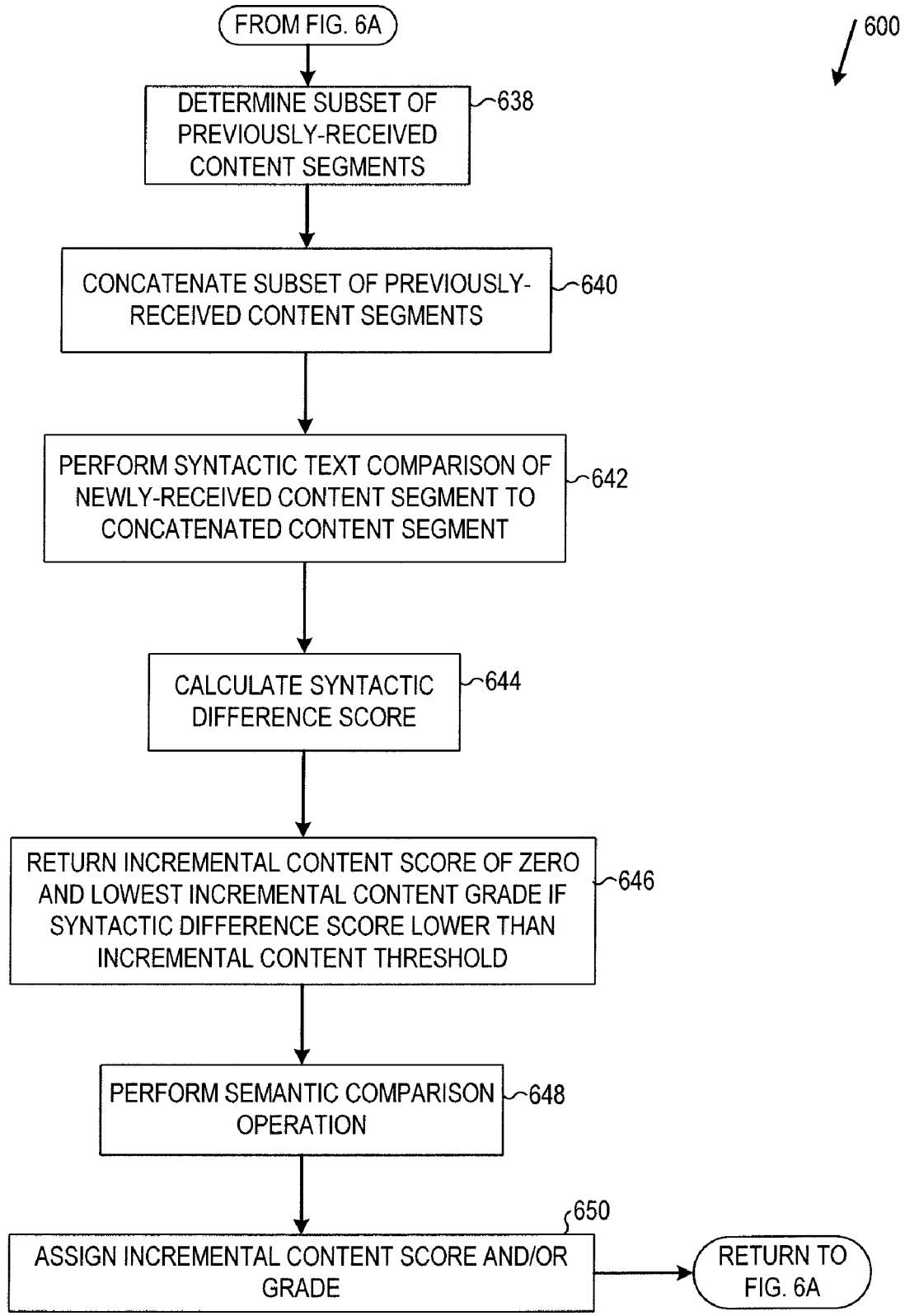
Figure 6E:
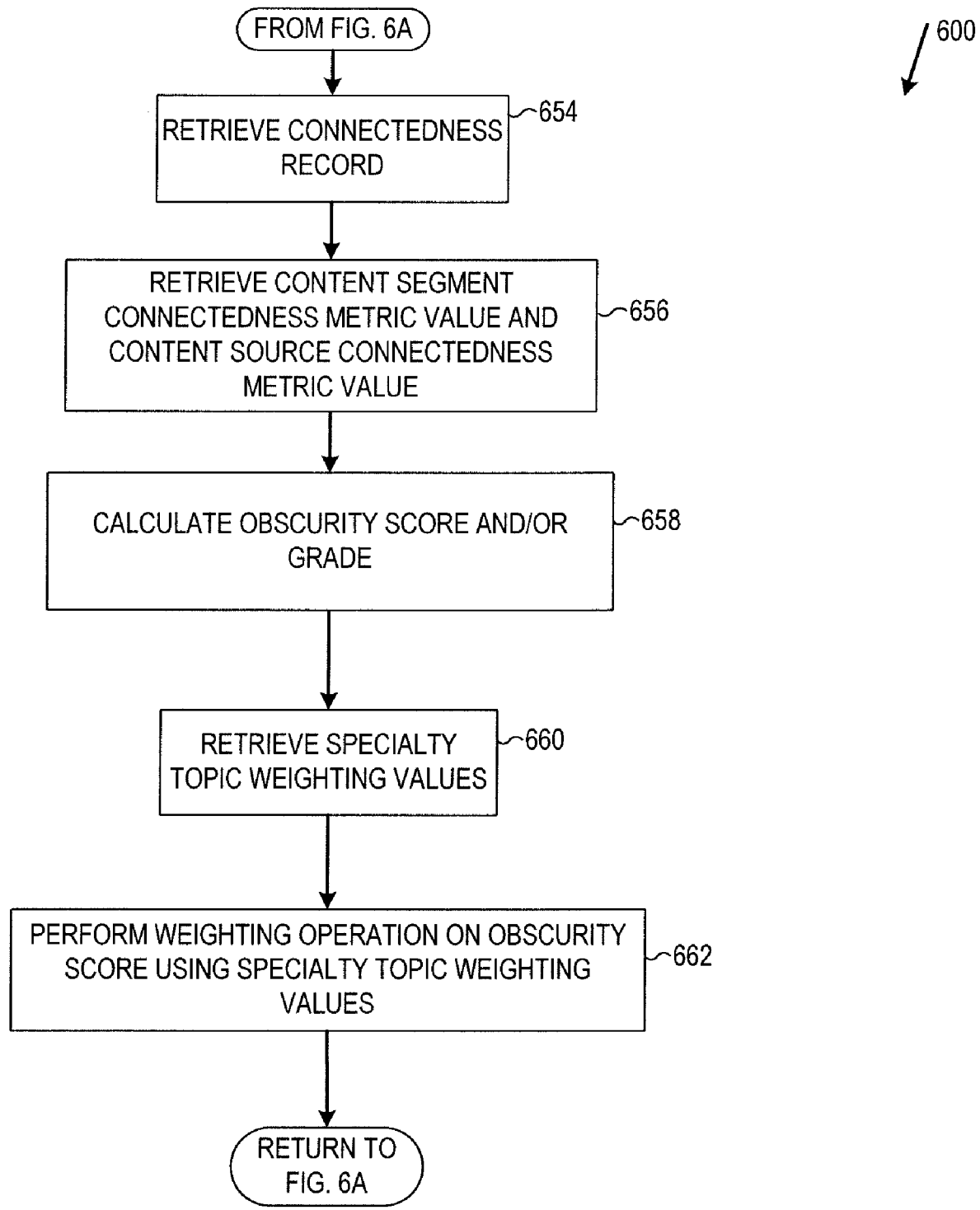
Figure 6F:
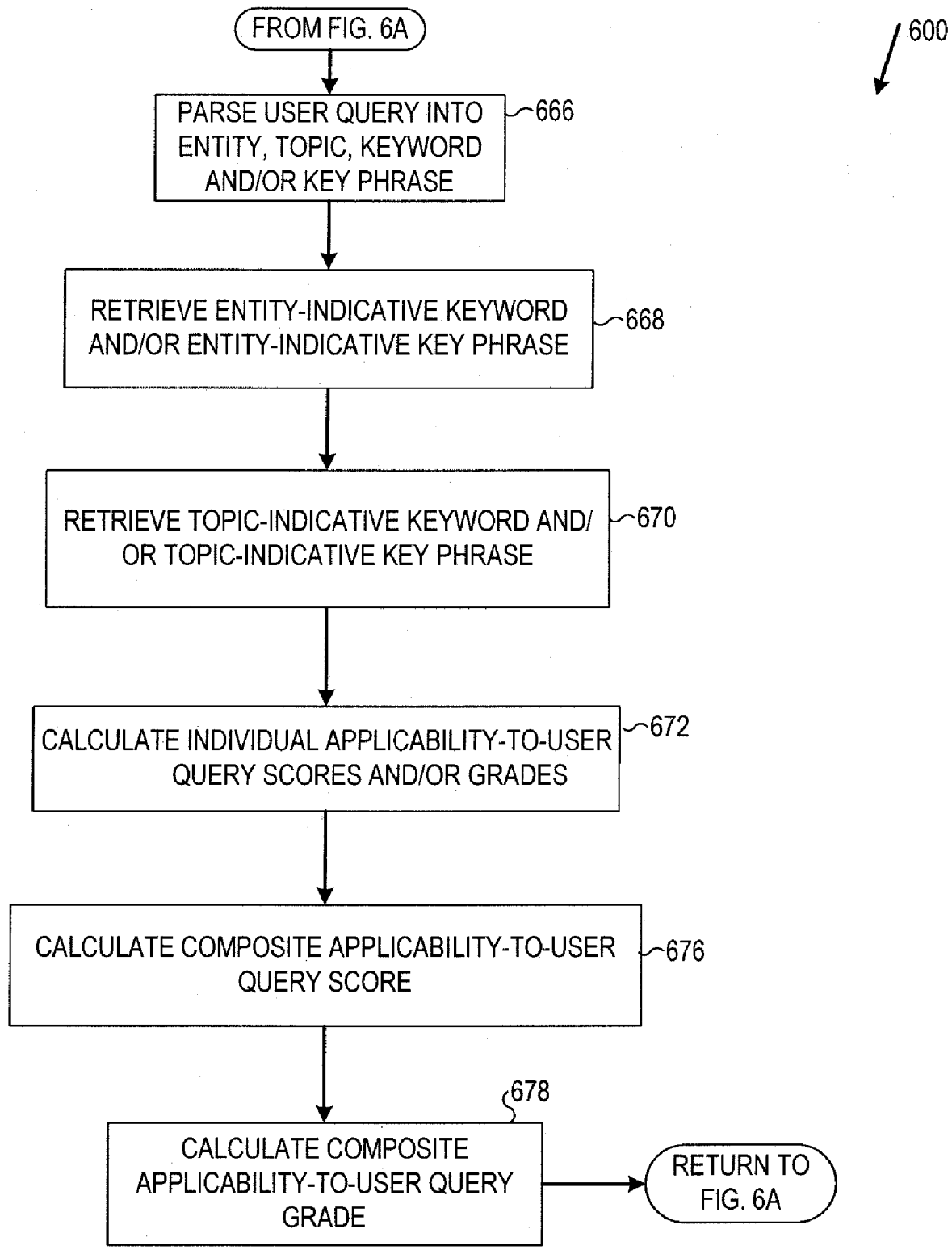
Figure 6G:
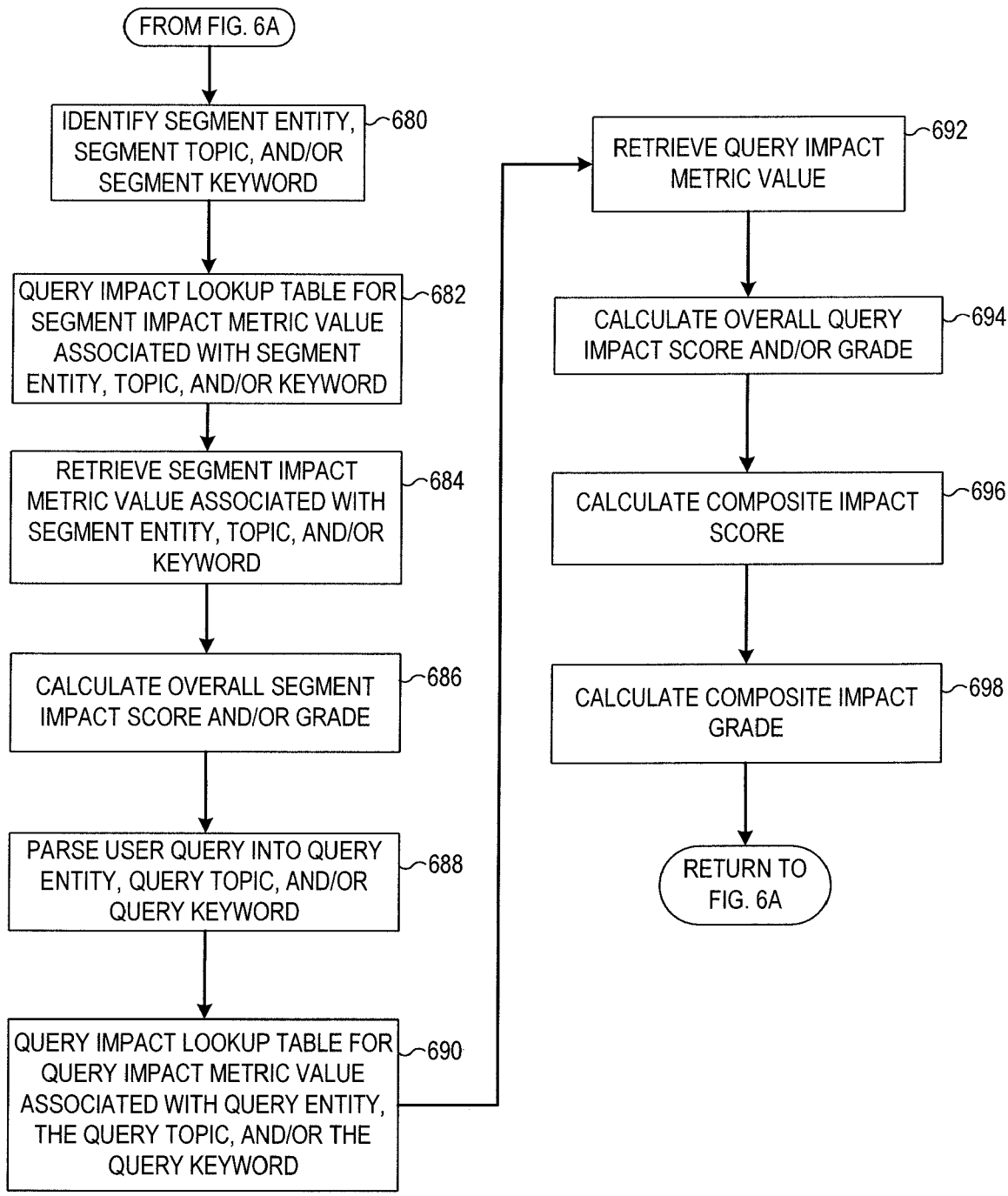

FIG. 3 is a numerical matrix showing relevance scores and grades across multiple content segments 310 as a function of the various content relevance scales 316 according to various example embodiments. In some embodiments a single relevance scale and a single content segment (e.g., the relevance scale 320 and the content segment 324) may be used to calculate the mathematical function of the relevance score (e.g., the relevance score 330) or the mathematical function of the relevance grade (e.g., the grade 336).

Turning back to FIG. 1 as seen in light of FIG. 3, the apparatus 100 may also include a composite scoring module 118 coupled to the scoring and grading module 110. The composite scoring module 118 calculates a composite mathematical function of the relevance scores associated with a single content segment across a plurality of content relevance scales (e.g., using the relevance scores 338 to obtain a result 340). The composite scoring module 118 also calculates a composite mathematical function of the relevance grades associated with a single content segment across a plurality of content relevance scales (e.g., to obtain a result 346).

The apparatus 100 may also include a multi-segment scoring module 122 coupled to the scoring and grading module 110. The multi-segment scoring module 122 calculates a multi-segment mathematical function of the relevance scores associated with a single relevance scale across multiple content segments (e.g., using the relevance grades 350 to obtain a result 356). The multi-segment scoring module 122 may also calculate a multi-segment mathematical function of the relevance grades associated with a single relevance scale across multiple content segments (e.g., using the relevance grades 360 to obtain a result 366).

Some embodiments may calculate a composite multi-dimensional relevance score (e.g., the relevance score 370) as a mathematical function of a two or more content relevance scales and two or more content segments. Some embodiments may calculate a composite multi-dimensional relevance grade (e.g., the relevance grade 376) as a mathematical function of two or more content relevance scales and two or more content segments.

A content segment filter 126 may be communicatively coupled to the scoring and grading module 110, to the user requirement input module 114, or to both. The content segment filter 126 filters the set of content segments associated with the content data stream to include only passing content segments. A content segment may be defined as passing if the mathematical function of the set of relevance scores or the mathematical function of the set of relevance grades is related to the mathematical function of the set of content quality threshold values according to a selected relationship.

For example, suppose that a set of threshold values {0.85, 0.77, 0.73, 0.91, 0.88, 0.85} is accepted and processed by the user requirement input module 114 for an embodiment using six relevance scales. Suppose further that both the mathematical function of the set of relevance scores and the mathematical function of the set of content quality threshold values is established as the mean function. Additionally, suppose that the selected relationship is established as the function of the relevance scores being equal to or greater than the function of the threshold values. Using these mathematical functions and relationships established at the user requirement input module 114, the embodiment may pass a content segment to a user if the mean of all relevance scores is equal to or greater than the mean of the set of threshold values {0.85, 0.77, 0.73, 0.91, 0.88, 0.85}.

A source type relevance scale measures the value an investment manager is likely to place on the type of source a content segment came from. For example, a major news source such as The Wall Street Journal carries authoritative news articles that are generally considered very reliable and comprehensive in their reporting. On the other hand, such a major news source is widely available to the investment management community. Consequently, information published in a major news source is likely to be known by many investment professionals may therefor provide little or no information advantage over the competition.

Local news sources including for example a newspaper published for circulation in a town or a county might carry news articles that are not widely available to the investment management community. An investment manager might obtain information on a local company from such a news source, for example, and might therefor gain an advantage over the competition. On the other hand, an investment professional may not be able to rely on a local news source for comprehensive coverage on a wide range of business issues.

From these examples it is clear that different types of sources have different perceived vales for investment managers. Classes of sources that can be evaluated for their perceived value to an investment manager may include press wires, news wires, major news sources, local news sources, industry-specific sources, blogs, and message boards, among others.

FIG. 4 is a content diagram of a content source lookup table (e.g., the content source lookup table 130 of FIG. 1) according to various example embodiments. The content source lookup table 130 may be coupled to the scoring and grading module 110. The scoring and grading module 110 may access the content source lookup table 130 to find relevance scores and/or relevance grades associated with sources of content found in a content segment being scored and/or graded.

Each record of the content source lookup table 130 relates a standard content source identifier 410 or a standard content source class identifier 416 to an entity-specific content source relevance score (e.g., the relevance score 420), a topic-specific content source relevance score (e.g., the relevance score 426), or a standard content source relevance score (e.g., the relevance score 430). Each record may also relate the standard content source identifier 410 or the standard content source class identifier 416 to an entity-specific content source relevance grade (e.g., the relevance grade 436), a topic-specific content source relevance grade (e.g., the relevance grade 442), or a standard content source relevance grade (e.g., the relevance grade 446).

The content source lookup table may be configured to use the standard content source class identifier 416 to retrieve the relevance score and/or the relevance grade in the absence of the standard content source identifier 410. The prefix "standard" is used in this context to signify a value that is standardized by virtue of having been stored in the content source lookup table 130.

A "market entity" record from the content source lookup table 130 includes a market entity identifier (e.g., the market entity identifier 448). The content source lookup table 130 may be configured to retrieve the entity-specific content source relevance score (e.g., the relevance score 420) and/or the entity-specific content source relevance grade (e.g., the relevance grade 436) if the market entity identifier is found in a query issued to the apparatus 100.

A "market topic" record from the content source lookup table 130 includes a market topic identifier (e.g., the market topic identifier 454). The content source lookup table 130 may be configured to retrieve the topic-specific content source relevance score (e.g., the relevance score 426) and/or the topic-specific content source relevance grade (e.g., the relevance grade 442) if the market topic identifier is found in a query issued to the apparatus 100.

The scoring and grading module 110 may use hypertext markup language (HTML) tags associated with a content segment, meta tags and/or meta information associated with the content segment, key words found in the content segment, or some other indicator of a content source, a class of the content source, an entity, and/or a topic associated with the content segment to retrieve a content source score and/or grade for the content segment.

The content source lookup table may be initially populated and subsequently maintained based upon research conducted on the perceived value of various sources and source classes. In some embodiments the research may consider the perceived values in light of specific topics and/or specific entities. The particular research techniques used may vary based upon the embodiments.

A content type relevance scale measures the value an investment manager is likely to place on the type of content contained in a content segment. For example, a press release from a company is likely to contain information that the company wants to make known to investors, customers, prospects and the market in general. Example press release information might relate to a financial results disclosure, a new product announcement, an executive team change, a strategic change announcement, and/or an operational change announcement, among others.

Laws, regulations, or standard business practices may require that a company conform to certain legal and ethical guidelines when issuing press releases. Information in a press release may therefor be considered to be authentic. On the other hand, information in a press release is widely available within seconds or minutes of being published. It is also likely to contain marketing "spin" as a company attempts to portray itself in a positive light notwithstanding the subject matter of the announcement. An investment manager doing historical research is likely to read information from press releases to understand what was happening at a given point in time. On the other hand a press release that is retrieved at the time of its publication is unlikely to provide a competitive advantage due to its instantaneous and wide availability.

In contrast, a blog posting by an employee of a company might contain interesting insight on the company. Such a blog posting is harder to find on the Internet and may not be seen by many people. Being able to read such a blog posting in a timely manner may provide a competitive advantage.

Embodiments herein may evaluate content segments for their perceived value to an investment manager based upon content types including press releases, wire news articles, bylined articles from independent news source, opinions and/or editorials in a newspaper, blog postings, and message board postings, among others. Some embodiments may recognize two content segments from the same source as containing information belonging to different classes of content types. For example a major news source such as the New York Times can have original bylined articles as well as syndicated wire news articles such as articles from the Associated Press news wire.

FIG. 5 is a content diagram of a content type lookup table (e.g., the content source lookup table 134 of FIG. 1) according to various example embodiments. The content type lookup table 134 may be coupled to the scoring and grading module 110. The scoring and grading module 110 may access the content type lookup table 134 to find relevance scores and/or relevance grades associated with types of sources of content found in a content segment being scored and/or graded. Each record of the content type lookup table relates a standard content type identifier 510 to a content type relevance score 520 and/or to a standard content type relevance grade 530. The content type lookup table is initially populated and subsequently maintained based on research on the perceived value of various content types. The particular research techniques used may vary based upon the embodiments.

The scoring and grading module 110 may use HTML tags associated with a content segment, key words found in the content segment, or some other indicator of content type associated with the content segment to retrieve a content type score and/or grade for the content segment from the content type lookup table 134.

Embodiments herein may also use the incremental content relevance scale 260 of FIG. 2 to measure the quantity of new information in a content segment relative to the information contained in content segments already received over some period of time. When researching a company, a sector, or a topic of interest, investment managers look for new pieces of information capable of providing additional insight beyond what is already known about the researched company, sector, or topic. Investment professionals place a high value on deriving additional, incremental insight. An incremental content relevance score indicates how likely it is for a content segment to carry additional insight beyond what is already known.

There is an implied temporal property associated with the incremental content relevance scale because the reference for comparison for each content segment is the set of content segments that have already been received over some period of time. The temporal property comes into play because of how information gets created and disseminated in the real world.

Typically "new" information is created when an event takes place. Such events may include a storm or other weather-related event, a company-related event such as a quarterly earnings release, or a political event such as an election result. Events are often reported in print media, internet media, and/or on radio and television. Event coverage may include factual descriptions of what happened as well as opinions and analysis of what the event implies. Sometimes speculations and rumors related to an event are disseminated before the event actually occurs. Some media organizations such as newswires, newspapers, and large media conglomerates carry primary coverage obtained by people covering the event, so-called "reporters on the beat." Other media organizations might choose to "syndicate" coverage from the larger media organizations. Syndicate subscribers carry the primary reports from the larger media organizations, perhaps without adding much additional information.

After the initial coverage, depending on the type of event, there could be ongoing coverage as the event unfolds. For example if a company announces it is facing an investigation from the Securities and Exchange Commission (SEC), initial coverage at the time of the announcement may be followed by ongoing coverage as to the progress of the investigation. Some media organizations may provide in-depth ongoing primary coverage while others may not.

Individuals and professional analysts may express their opinions and analysis on the event when it breaks or as it unfolds. This can happen through media channels or via internet-based channels such as blogs and message boards. The advent of the Internet has spurred primary reporting by individuals who are not acting on behalf of media outlets. These freelance journalists may report on events through internet-based blogs and message boards. As the information on an event proliferates through the various channels it becomes important to assess which reports that are included in content segments contain new incremental insight. Otherwise a large volume of information may be presented around the same event or topic that includes little or no new insight.

Embodiments herein score incremental content by comparing information in a content segment with information in content segments that have already been received. The comparisons involved are both syntactic and semantic. Syntactic comparisons are used to compare the actual sentences and paragraphs of text in documents. Semantic comparisons are used to figure out similarities in the actual meaning of the subject matter contained in the content segment.

Turning back to FIG. 1, the apparatus 100 may include an historical content segment database 138 coupled to the scoring and grading module 110. The historical content segment database 138 stores a set of previously-received content segments or an index of storage locations associated with the set of previously-received content segments. The scoring and grading module 110 may access the historical content segment database 138 during operations that require a comparison of attributes associated with newly-received content segments to attributes associated with previously-received content segments.

The scoring and grading module 110 may use a subset of the previously-received content segments for the comparison operations. The subset may include historical content segments that are most closely-related to the newly-received content segments. Some embodiments may use categories and/or tags to determine the proximity of relationship. The categories and/or tags may have been assigned during the course of an earlier-performed content segment categorization process.

The apparatus 100 may also include a syntactic comparison module 144 coupled to the scoring and grading module 110. The syntactic comparison module 144 performs a syntactic comparison operation to compare a sentence associated with a newly-received content segment to one or more sentences associated with a concatenated set of previously-received content segments. The comparison operation is performed to identify sentences in the newly-received content segment that are syntactically different from each of the sentences associated with the previously-received content segments.

The syntactic comparison module 144 may also syntactically compare a paragraph associated with the newly-received content segment to one or more paragraphs associated with the previously-received content segments. The latter operation uses mathematical, statistical, and linguistic techniques known to those skilled in the art to identify paragraphs in the newly-received content segment that are syntactically different from the paragraphs associated with the previously-received content segments. The syntactic comparison module 144 calculates a syntactic difference score based upon the number of syntactically different sentences and paragraphs found.

Some embodiments may compare the syntactic difference score to a low-score threshold value. Newly-received content segments with a syntactic difference score lower than the low-score threshold value may be assigned an incremental content relevance score of zero and a lowest-available incremental content relevance grade. If the syntactic difference score is greater than or equal to the low-score threshold value, the apparatus 100 may proceed to identify specific areas of text within the newly-received content segment that differ from the historical content segments ("differential text").

The apparatus 100 may also include a semantic comparison module 150 coupled to the scoring and grading module 110. Using mathematical, statistical, and linguistic techniques known to those skilled in the art, the semantic comparison module 150 performs semantic comparison operations on the differential text. The differential text is compared to the concatenated version of the previously-received content segments to determine whether the content associated with the newly-received content segment contains new information. Incremental content scores and grades are then assigned based upon the amount of text in the newly-received content segment that is both syntactically and semantically different from the information in the previously-received content segments.

An obscurity relevance scale measures how little-known the information in a content segment is likely to be. Investment managers are always looking for information that will give them an edge over the competition. Information that is useful, as measured by other relevance scales, and is not known by many people is of high value to investment managers. Obscurity can be thought of as the opposite of popularity. For investment managers, the more "popular" the information the more likely that it is known by more people. Popular information is less likely to provide a competitive advantage.

Embodiments herein measure obscurity by analyzing link structures on the Web to gauge the degree of connectedness and in turn the popularity of a web page. The lower the degree of connectedness of a Web page or the source of the Web page, the higher the obscurity of the Web page and/or its source.

A relative aspect may be associated with obscurity. Content that may be obscure to a certain set of people may not be obscure for others. For example, a web site that publishes research information on a highly specialized disease area may be obscure to an investment manager who is a generalist but it may be less obscure to an investment manager who has a sector focus on the pharmaceutical industry. Thus embodiments herein may take into consideration a particular user's background while scoring obscurity associated with a content segment retrieved for the particular user.

The apparatus 100 may include a connectedness metric lookup table 154 coupled to the scoring and grading module 110. Each record of the connectedness metric lookup table 154 may relate a content segment identifier to a content segment connectedness metric value and a content source connectedness metric value. The content segment connectedness metric value corresponds to a number of inbound and outbound links associated with a page comprising the content segment to be scored and/or graded. The content source connectedness metric value corresponds to connectedness metric values associated with each page of the source of the content segment to be scored and/or graded.

Those skilled in the art will understand that the Web can be thought of as a large graph with web pages as nodes and hyperlinks between pages as directional links between nodes. Many internet search engines traverse the Web on an ongoing basis to build and maintain a graph view of the Web. This graph view can be used to understand the degrees of connectedness as described above.

A distinction is made between the degree of connectedness of a source and that of a page. A source might not be well connected overall; however a subset of pages within the source might have a high degree of connectedness. This could happen on a blog site where many people host their individual blogs. The overall blog site may be less popular and thus have a low degree of connectedness. Specific individual blogs on the site might enjoy a high degree of popularity and may thus be characterized as having a high degree of connectedness. It is also possible for the overall source to have a high degree of connectedness and the individual pages from the source to have a lower degree of connectedness. The obscurity relevance metric is inversely proportional to both the content segment connectedness metric value and the source connectedness metric value.

Some embodiments may take into account the user profile and weight the obscurity of the source relative to the user profile. If a source has information on specialized topics, then users who are experts in those topics are likely to find the source less obscure. The apparatus 100 may thus include a specialty topic weighting lookup table 158 coupled to the scoring and grading module 110. Each record of the specialty topic weighting lookup table 158 relates a source of the content segment to be scored and/or graded and a specialty topic to a weighting factor. Some embodiments may use the weighting factor to decrease the obscurity score delivered to a market information subscriber with expertise in the specialty topic.

An "applicability to user query" relevance scale analyzes the information in a content segment in the context of the user query and measures how closely a content segment matches user information requirements. The user information requirements may be received in the form of an interactive query entered at a search interface. Alternatively, user information requirements may be saved in a query that is used to trigger delivery of matching information for delivery at a later time.

The applicability to user query metric value is calculated only for content segments that are a match for the user query. For example if the user query had just the phrase "mortgage rates" in it, then the returned content segments might range from a news article that has mortgage rates as the central theme to a blog posting where the author makes a passing reference to his or her home mortgage rate while talking about an entirely unrelated subject. Clearly the news article matches the information requested by the user query more closely than the blog posting.

Taking another example, suppose that the user query searches for information on "Microsoft AND IBM". The returned results could include an article discussing the competitive relationship between these entities in some market segments on the one hand and their partnering relationship in other market segments on the other hand. The returned search results could also include an article discussing IBM's strategic plan for the next 3 years and how Microsoft and other major technology companies fit into that plan. The results could also include an article discussing Microsoft's annual financial results which mentions in passing that IBM posted lower profit margins for the same fiscal period. Each of the articles above has a different "degrees of closeness" in terms of matching user requirements as specified in the user query.

For each keyword, keyphrase, entity, and topic in the query the applicability to user query scale can be measured using several factors including the frequency of occurrence of the keyword, keyphrase, entity, and/or topic. The keyword, keyphrase, entity, and/or topic occurring multiple times is indicative of higher applicability. If the phrase "mortgage rates" appears several times in the article of the example above the article is likely to be about mortgage rates.

The location of the keyword, keyphrase, entity, and/or topic in the content segment is also important. If the keyword, keyphrase, entity, and/or topic appears in the main title or a section heading within the text of the content segment, higher applicability is indicated. It is thus reasonable to assume that Microsoft or IBM is the primary theme of the article in the above example if the entity Microsoft or the entity IBM is mentioned in the title of the article.

Visual cues such as a large font size and/or a special font style (e.g., bold, italics) used for the phrase within the text of the content segment are also indicative of higher applicability. Such visual cues are used for emphasis and serve to draw attention to specific pieces of text. In the example above a closer match is indicated if the phrase "mortgage rates" is in bold within the article.

Occurrence of the phrase in a caption associated with a picture within the content segment may indicate higher applicability. Occurrence of the phrase in anchor text associated with a link pointing to the currently-examined content segment may also indicate higher applicability.

The apparatus 100 may thus include an entity-topic knowledgebase (ETK) 164 coupled to the scoring and grading module 110. The ETK 164 may include a market entity dataset 166, a market topic dataset 168, and a set of semantic rules 170 associated with the market entity dataset 166 and with the market topic dataset 168. The set of semantic rules 170 may be used to identify a reference to a market entity or a market topic in a content segment.

The apparatus 100 may also include an ETK administrative graphical user interface (GUI) 172 communicatively coupled to the ETK 164. The ETK GUI 172 receives the market entity dataset 166, the market topic dataset 168, and/or the set of semantic rules 170. A market entity loading module 174 may be coupled to the ETK to load the market entity dataset 166 and a subset of the set of semantic rules 170 associated with one or more market entity representations contained in the market entity dataset 166. The apparatus 100 may also include a market topic loading module 176 coupled to the ETK 164. The market topic loading module 176 loads the market topic dataset 168 and a subset of the set of semantic rules 170 associated with a plurality of market topic representations contained in the market topic dataset 168.

The impact relevance scale measures the perceived market impact of information contained in a content segment to be scored and/or graded. "Market" in this context refers to the financial markets. Market impact may be measured in the context of specific entities and is typically not measured in the context of topics. Examples of these entities include companies listed on a stock exchange, mutual funds, traded commodities such as oil, grain and livestock, market sectors, and currencies. In the case of market sectors, impact may be quantified using sector benchmarks. This list of example entities is not meant to be exhaustive.

As an example of market impact, a content segment containing an announcement of a merger or an acquisition may be considered as high impact because such announcements often cause stock prices to increase or decrease. Other impactful events may include major lawsuits against companies, executives joining or leaving a firm, earnings announcements, financial estimate changes, analyst upgrades or downgrades, and major changes in government regulations, among others.

Market impact may involve a set of entities within the same content segment. For example, a content segment may focus on a merger between two companies A and B but might also mention a company C in some other passing context. In this case the content segment is high-impact for the companies A and B but low-impact for the company C.

Although market impact is generally considered in the context of one or more market entities as discussed above, some embodiments may derive a measure of market impact that is independent of entities mentioned in the content segment. Considering further the example cited above, if the merger announcement is the primary subject of the content segment then the overall impact of the content segment could still be considered high even though the specific impact on Company C is low. Embodiments herein may thus measure market impact by gauging the overall impact of information in the content segment and/or by gauging the impact of information in the content segment on specific entities found within the content segment.

It is also noted that market impact is calculated for a content segment returned as a match responsive to a user query that may include entities and/or topics. Some embodiments may thus measure the market impact of information in the content segment on the entities and/or topics included in the user query.

The apparatus 100 may include an impact lookup table 180 coupled to the scoring and grading module 110. Each record of the impact lookup table 180 relates one or more entities, topics, keywords and/or combinations thereof to an impact metric value associated with the entities, the topics, the keywords, and/or the combinations.

The apparatus 100 may also include a content quality feedback module 184 coupled to the user requirement input module 114. The content quality feedback module 184 accepts feedback information from one or more content consumers and adjusts the set of content quality threshold values in order to dynamically adjust subsequent output to match user requirements.

In another embodiment, a system 190 may include one or more of the apparatus 100, including a scoring and grading module 110 and a content segment filter 126. The system 190 may also include a search application 194. The search application 194 may send user queries, filtering threshold values, and a content segment stream to the apparatus 100. The apparatus 100 may return a set of filtered data to the search application 194. The returned data may include a set of relevant content segments, selected according to the user query and threshold values, along with scores and grades used to filter the content segment stream.

The apparatus and systems of various embodiments may be useful in applications other than assessing relevance scores and grades associated with content segments retrieved for an investment professional. Thus, the current disclosure is not to be so limited. The illustrations of the apparatus 100 and the system 190 are intended to provide a general understanding of the structure of various embodiments. They are not intended to serve as a complete or otherwise limiting description of all the elements and features of apparatus and systems that might make use of the structures described herein.

The novel apparatus and systems of various embodiments may comprise and/or be included in electronic circuitry used in computers, communication and signal processing circuitry, single-processor or multi-processor modules, single or multiple embedded processors, multi-core processors, data switches, and application-specific modules including multi-layer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

FIGS. 6A-6G are flow diagrams illustrating an example method 600 according to various embodiments. The method 600 operates to score and grade information content according to pre-specified user interests and requirements. Some embodiments operate on content segments (e.g., HTML pages) retrieved in response to an information query. The information content is then filtered according to pre-specified threshold values such that content falling below the threshold values is filtered before presentation to a user.

The method 600 may commence at block 604 with receiving a set of content quality threshold values and a search string at a content quality metric (CQM) apparatus. The method 600 may continue with receiving a content data stream at the CQM apparatus, at block 606. The method 600 may include scoring one or more content segments from the content data stream according to a set of scorable content relevance scales, at block 608. The method 600 may also include grading the content segments according to a set of gradable content relevance scales to obtain a set of relevance grades for the content segment, at block 610.

The scorable and gradable content relevance scales may comprise a source type metric, a content type metric, an incremental content metric, an obscurity metric, an applicability to user query metric, or an impact metric, among others. A set of relevance scores for the content segments may result from the scoring and grading operations.

The method 600 may commence calculating the source type metric value by obtaining a standard content source identifier and/or a standard content source class identifier associated with the content segment for which relevance is being measured, at block 612. The standard content source identifier and/or standard content source class identifier may be extracted from the content segment or may be found in metadata associated with the content segment.

The method 600 may continue at block 614 with retrieving one or more content source records from the content source lookup table using the standard content source identifier if available. The method 600 may include retrieving the content source records using the standard content source class identifier if the standard content source identifier is not available, at block 616.

The method 600 may also include determining whether a market entity identifier associated with one or more of the content source records exists in a user query associated with content segment retrieval operations, at block 618. If the market entity identifier associated with the content source records exists in the user query, the method 600 may include retrieving an entity-specific content source relevance score associated with the records, an entity-specific content source relevance grade associated with the records, or both, at block 620.

The method 600 may further include determining whether a market topic identifier associated with one or more of the content source records exists in the user query, at block 622. If the market topic identifier exists in the user query, the method 600 may include retrieving a topic-specific content source relevance score associated with the record, a topic-specific content source relevance grade associated with the record, or both, at block 624. If neither the market entity identifier nor the market topic identifier exists in the user query, the method 600 may include retrieving a standard content source relevance score, a standard content source relevance grade, or both, at block 626.

If multiple market entities and/or market topics associated with one or more of the content source records exist in the user query, a composite content source relevance score and content source relevance grade may be calculated using the individual entity-specific or topic-specific content source relevance scores and the individual entity-specific or topic-specific content source relevance grades.

The method 600 may commence calculating the content type metric value by obtaining a standard content type identifier associated with the at least one content segment, at block 630. Calculation of the content type metric value may continue at block 632 with retrieving one or more content type records from a content type lookup table using the standard content type identifier. The method 600 may also include retrieving a standard content type relevance score associated by the content type lookup table with the standard content type identifier, a standard content type relevance grade associated with the identifier, or both, at block 634.

The method 600 may commence calculating the incremental content metric value by determining a subset of previously-received content segments stored in a historical content segment database, at block 638. The subset may be chosen based upon the relatedness of the previously-received content segments to the newly-received content segment for which relevancy is being determined. Relatedness may be based upon a comparison of categories and HTML tags assigned to the previously-received content segments and to the newly-received content segment, respectively. Relatedness may also be determined based upon a temporal proximity of the previously-received content segments to the newly-received content segment.

The method 600 may continue with concatenating the subset of previously-received content segments to create a concatenated content segment, at block 640. The method 600 may also include performing a syntactic text comparison of the newly-received content segment to the concatenated content segment, at block 642. The syntactic comparison is performed to identify portions of the newly-received content segment that are different from the concatenated content segment.

The method 600 may include calculating a syntactic difference score based upon the syntactic comparison, at block 644. The method 600 may also include returning an incremental content score of zero and a lowest possible incremental content grade if the syntactic difference score is less than or equal to a selected incremental content threshold score, at block 646.

The method 600 may continue at block 648 with performing a semantic comparison operation on the newly-received content segment and on the concatenated content segment to obtain a semantic difference score. The method 600 may include assigning an incremental content score, an incremental content grade, or both to the newly-received content segment, at block 650. The incremental content score and grade may be based upon an amount of content that is both syntactically different and semantically different between the newly received content segment and the concatenated content segment.

The method 600 may commence calculating an obscurity metric value by retrieving a connectedness record from a connectedness metric lookup table, at block 654. The connectedness record may be retrieved using a content segment identifier associated with the content segment for which relevance is being determined. The method 600 may include retrieving a content segment connectedness metric value and a content source connectedness value from the connectedness metric lookup table, at block 656.

The method 600 may also include calculating an obscurity score associated with the content segment, an obscurity grade associated with the content segment, or both, at block 658. The obscurity score and the obscurity grade may both comprise a function of the content segment connectedness metric value and the content source connectedness value.

The obscurity score and grade may be weighted by the user profile, as previously mentioned, because a user who is expert on a specialized topic being searched may be relatively more familiar with sources of the specialized topic. The latter situation may tend to render the source less obscure. The method 600 may thus continue with retrieving one or more specialty topic weighting values from a specialty topic weighting table, at block 660. The weighting values may be retrieved using one or more specialty topics associated with the user profile and with a source of the content segment, assuming that the specialty topics are associated with or included within the content segment. The method 600 may also included performing a weighting operation on the obscurity score using the specialty topic weighting values, at block 662.

The method 600 may commence calculating an applicability to user query metric value by parsing a user query into an entity, a topic, a keyword, and/or a key phrase, at block 666. The method 600 may include retrieving an entity-indicative keyword, an entity-indicative key phrase, or both from an ETK using the entity, at block 668. The method 600 may also include retrieving a topic-indicative keyword, a topic-indicative key phrase, or both from the ETK using the topic, at block 670.

The method 600 may continue at block 672 with calculating a set of individual applicability to user query scores, a set of individual applicability to user query grades, or both. Each individual applicability to user query score or grade may be associated with the keyword, the key phrase, the entity-indicative keyword, the entity-indicative key phrase, the topic-indicative keyword, or the topic-indicative key phrase. Each individual applicability to user query score or grade may be based upon a frequency of occurrence of the keyword, the key phrase, the entity-indicative keyword, the entity-indicative key phrase, the topic-indicative keyword, or the topic-indicative key phrase in the content segment. The individual scores and grades may also be based upon a prominence of location of the keyword, the key phrase, the entity-indicative keyword, the entity-indicative key phrase, the topic-indicative keyword, or the topic-indicative key phrase in the content segment. The individual scores and grades may further be based upon a prominence of textual attributes associated with the keyword, the key phrase, the entity-indicative keyword, the entity-indicative key phrase, the topic-indicative keyword, or the topic-indicative key phrase in the content segment. The individual scores and grades may be based upon an occurrence of the keyword, the key phrase, the entity-indicative keyword, the entity-indicative key phrase, the topic-indicative keyword, or the topic-indicative key phrase in a picture caption within the at least one content segment. The individual scores and grades may also be based upon an occurrence of the keyword, the key phrase, the entity-indicative keyword, the entity-indicative key phrase, the topic-indicative keyword, or the topic-indicative key phrase in anchor text associated with an HTTP link pointing to the content segment.

The method 600 may include calculating a composite applicability to user query score associated with the content segment, at block 676. The composite applicability to user query score may comprise a mathematical function of the set of individual applicability to user query scores. The method 600 may also include calculating a composite applicability to user query grade associated with the at least one content segment, at block 678. The composite applicability to user query grade may comprise a mathematical function of the set of individual applicability to user query scores.

The method 600 may commence calculating an impact metric value by identifying one or more of a segment entity, a segment topic, or a segment keyword in the content segment, at block 680. The method 600 may include querying an impact lookup table for one or more of a segment impact metric value associated with the segment entity, a segment impact metric value associated with the segment topic, or a segment impact metric value associated with the segment keyword, at block 682. The method 600 may also include retrieving the segment impact metric value associated with the segment entity, the segment impact metric value associated with the segment topic, and/or the segment impact metric value associated with the segment keyword, at block 684.

The method 600 may further include calculating an overall segment impact score, an overall segment impact grade, or both, at block 686. The overall impact score or grade may be calculated as a function of the segment impact metric value associated with the segment entity, the segment impact metric value associated with the segment topic, and/or the segment impact metric value associated with the segment keyword.

The method 600 may continue at block 688 with parsing a user query used to retrieve a content segment into one or more of a query entity, a query topic, or a query keyword. The method 600 may include querying the impact lookup table for a query impact metric value associated with one or more of the query entity, the query topic, and/or the query keyword, at block 690. The method 600 may also include retrieving the query impact metric value associated with the query entity, the query topic, and/or the query keyword, at block 692.

The method 600 may continue at block 694 with calculating an overall query impact score, an overall query impact grade, or both as a function of the query impact metric value associated with the query entity, the query topic, and/or the query keyword. The method 600 may include calculating a composite impact score as a function of the overall segment impact score and the overall query impact score, at block 696. The method 600 may also include calculating a composite impact grade as a function of the overall segment impact grade and the overall query impact grade, at block 698.

Having calculated scores and grades associated with the various relevancy metric scales, the method 600 may proceed at block 699 with filtering the content data stream to include passing content segments. The passing content segments may be forwarded to a search application or directly to a user. Some embodiments may also forward intermediate calculation values used to determine whether a content segment is passing. A content segment is defined as passing if a mathematical function of the set of relevance scores or the set of relevance grades is related to a mathematical function of a set of content threshold values according to a selected relationship, as previously described.

Figure 7:
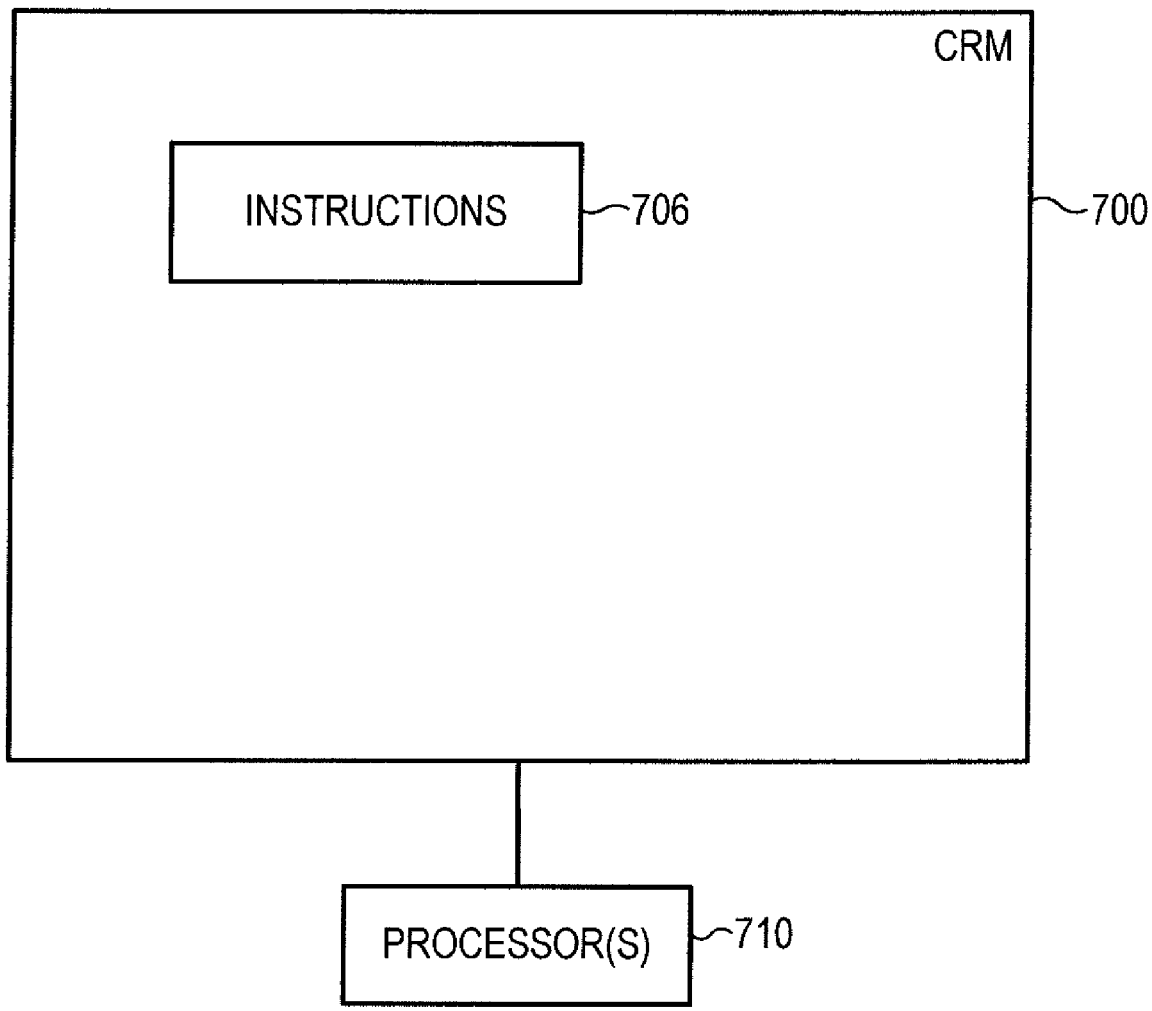
FIG. 7 is a block diagram of a computer-readable medium according to various example embodiments.

FIG. 7 is a block diagram of an example computer-readable medium (CRM) 700 according to various embodiments of the invention. Examples of such embodiments may comprise a memory system, a magnetic or optical disk, or some other storage device. The CRM 700 may contain instructions 706 which, when accessed, result in one or more processors 710 performing any of the activities previously described, including those discussed with respect to the method 700 noted above.

The apparatus, systems, and methods disclosed herein operate to assess the relevance of content segments retrieved for an investment professional by scoring and grading the content segments according to a set of content relevance scales. Content relevance threshold levels may be set according to user requirements. Content segments meeting or exceeding the threshold levels may be forwarded to the user. Content segments scoring below the predefined threshold levels may be hidden from the user to prevent information overload. More relevant, focused, and targeted content may be directed to an investment professional as a result.

The accompanying drawings that form a part hereof show, by way of illustration and not of limitation, particular embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefor, is not to be taken in a limiting sense. The scope of various embodiments is defined by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, comprising:
   one or more processors;
   a scoring and grading module to score, using the one or more processors, at least one content segment of a set of content segments associated with a content data stream according to a set of scorable content relevance scales to obtain at least one relevance score, the at least one relevance score corresponding to a numerical value at a point along an associated scorable relevance scale, and to grade at least one content segment of the set of content segments according to a set of gradable content relevance scales to obtain at least one relevance grade, the at least one relevance grade corresponding to a zone along an associated gradable relevance scale;
   a content segment filter communicatively coupled to the scoring and grading module to filter the set of content segments to include only passing content segments, a content segment defined as passing based on a mathematical function of the at least one relevance score being related to a mathematical function of a set of content quality threshold values associated with the at least one relevance score according to a selected scoring threshold relationship or based on a mathematical function of the at least one relevance grade being related to a mathematical function of a set of content quality threshold values associated with the at least one relevance grade according to a selected grading threshold relationship;
   a historical content segment database coupled to the scoring and grading module to store at least one of a set of previously-received content segments or an index of storage locations associated with the set of previously-received content segments; and
   a syntactic comparison module coupled to the scoring and grading module to compare a sentence associated with a newly-received content segment to each of a plurality of sentences associated with a concatenated set of previously-received content segments to identify sentences in the newly-received content segment that are syntactically different from each of the plurality of sentences associated with the concatenated set of previously-received content segments, to compare a paragraph associated with the newly-received content segment to each of a plurality of paragraphs associated with the concatenated set of previously-received content segments to identify paragraphs in the newly-received content segment that are syntactically different from each of the plurality of paragraphs associated with the concatenated set of previously-received content segments, and to obtain a syntactic difference score based upon a number of syntactically different sentences and a number of syntactically different paragraphs found.

2. The apparatus of claim 1, further comprising:
   a user requirement input module communicatively coupled to the scoring and grading module and to the content segment filter to accept at least one of a search string or the set of content quality threshold values.

3. The apparatus of claim 2, further comprising:
   a content quality feedback module coupled to the user requirement input module to accept feedback information from at least one content consumer and to adjust the set of content quality threshold values in order to dynamically adjust subsequent output to match user requirements.

4. The apparatus of claim 1, wherein the mathematical function of the at least one relevance score, the mathematical function of the at least one relevance grade, and the mathematical function of the set of content quality threshold values comprise at least one of a numerical function, a boolean function, or an alphanumeric string comparison function.

5. The apparatus of claim 1, configured to calculate the mathematical function of the at least one relevance score using a single one of the set of content relevance scales and a single content segment and configured to calculate the mathematical function of the at least one relevance grade using a single one of the set of content relevance scales and a single content segment.

6. The apparatus of claim 1, further including:
   a composite scoring module to calculate a composite mathematical function of the at least one relevance score using a plurality of content relevance scales and a single content segment and to calculate a composite mathematical function of the at least one relevance grade using a plurality of content relevance scales and a single content segment.

7. The apparatus of claim 1, further including:
   a multi-segment scoring module to calculate a multi-segment mathematical function of the at least one relevance score using a single content relevance scale and a plurality of content segments and to calculate a multi-segment mathematical function of the at least one relevance grade using a single content relevance scale and a plurality of content segments.

8. The apparatus of claim 1, configured to calculate a composite multi-dimensional relevance score using a plurality of content relevance scales and configured to calculate a multi-dimensional relevance grade using a plurality of content relevance scales and a plurality of content segments.

9. The apparatus of claim 1, further comprising:
a content source lookup table coupled to the scoring and grading module, each record of the content source lookup table to relate at least one of a standard content source identifier or a standard content source class identifier to at least one of an entity-specific content source relevance score, a topic-specific content source relevance score, a standard content source relevance score, an entity-specific content source relevance grade, a topic-specific content source relevance grade, or a standard content source relevance grade.

10. The apparatus of claim 9, wherein the content source lookup table is configured to use the standard content source class identifier to retrieve at least one of the entity-specific content source relevance score, the topic-specific content source relevance score, the standard content source relevance score, the entity-specific content source relevance grade, the topic-specific content source relevance grade, or the standard content source relevance grade in an absence of the standard content source identifier.

11. The apparatus of claim 9, wherein a market entity record of the content source lookup table further comprises a market entity identifier and wherein the content source lookup table is configured to retrieve at least one of the entity-specific content source relevance score or the entity-specific content source relevance grade if the market entity identifier is found in a query issued to the apparatus.

12. The apparatus of claim 9, wherein a market topic record of the content source lookup table further comprises a market topic identifier and wherein the content source lookup table is configured to retrieve at least one of the topic-specific content source relevance score or the topic-specific content source relevance grade based on the market topic identifier being found in a query issued to the apparatus.

13. The apparatus of claim 1, further comprising:
a content type lookup table coupled to the scoring and grading module, each record of the content type lookup table to relate a standard content type identifier to a content type relevance score and to a standard content type relevance grade.

14. The apparatus of claim 1, further comprising:
a semantic comparison module coupled to the scoring and grading module to perform a semantic comparison between content associated with the newly-received content segment and content associated with the concatenated version of the previously-received content segments to determine whether the content associated with the newly-received content segment contains new information.

15. The apparatus of claim 1, further comprising:
a connectedness metric lookup table coupled to the scoring and grading module, each record of the connectedness metric lookup table to relate a content segment identifier to a content segment connectedness metric value and to relate an identifier associated with a source of the content segment to a content source connectedness metric value.

16. The apparatus of claim 1, further comprising:
a specialty topic weighting lookup table coupled to the scoring and grading module, each record of the specialty topic weighting lookup table to relate a source of the at least one content segment and a specialty topic to a weighting factor, the weighting factor to be used to decrease an obscurity score delivered to a market information subscriber with expertise in the specialty topic.

17. The apparatus of claim 1, further comprising:
an entity-topic knowledgebase (ETK) coupled to the scoring and grading module including an entity dataset, a topic dataset, and a set of semantic rules associated with the entity dataset and with the topic dataset, the set of semantic rules to be used to identify a reference to at least one of an entity or a topic in a content segment.

18. The apparatus of claim 17, further comprising:
an ETK administrative graphical user interface (GUI) communicatively coupled to the ETK to receive a market entity dataset, a market topic dataset, and a set of semantic rules;
a market entity loading module coupled to the ETK to load the market entity dataset and a subset of semantic rules associated with a plurality of market entity representations contained in the market entity dataset; and
a market topic loading module coupled to the ETK to load the market topic dataset and a subset of semantic rules associated with a plurality of market topic representations contained in the market topic dataset.

19. The apparatus of claim 1, further comprising:
an impact lookup table coupled to the scoring and grading module, each record of the impact lookup table to relate at least one of an entity, a topic, a keyword, or a combination of the entity, the topic or the keyword to an impact metric value associated with the entity, the topic, the keyword, or the combination.

20. A method of computing content relevance, comprising:
receiving a set of content quality threshold values and a search string at a content quality metric (CQM) apparatus;
receiving a content data stream at the CQM apparatus;
scoring at least one content segment associated with the content data stream according to a set of scorable content relevance scales to achieve a set of relevance scores for the at least one content segment;
grading, using one or more processors, the at least one content segment according to a set of gradable content relevance scales to obtain a set of relevance grades for the at least one content segment;
filtering the content data stream to include passing content segments and intermediate calculation values used to determine whether a content segment is passing, a content segment defined as passing based on a mathematical function of at least one of the set of relevance scores or the set of relevance grades being related to a mathematical function of a set of content threshold values according to a selected relationship;
determining a subset of previously-received content segments stored in an historical content segment database;
concatenating the subset of previously-received content segments to create a concatenated content segment; and
performing a syntactic text comparison of a newly-received content segment to the concatenated content segment to identify portions of the newly-received content segment that are different from the concatenated content segment and to calculate a syntactic difference score.

21. The method of claim 20, wherein at least one of the set of scorable content relevance scales or the set of gradable content relevance scales comprises at least one of a source type metric, a content type metric, an incremental content metric, an obscurity metric, an applicability to user query metric, or an impact metric.

22. The method of claim 20, further including:
obtaining at least one of a standard content source identifier or a standard content source class identifier associated with the at least one content segment;
retrieving at least one content source record from a content source lookup table using the standard content source identifier based on the standard content source identifier being available;
retrieving the at least one content source record using the standard content source class identifier based on the standard content source identifier being not available;
determining whether a market entity identifier associated with the at least one content source record exists in a user query associated with content segment retrieval operations;
based on the market entity identifier associated with the at least one content source record existing in the user query, retrieving at least one of an entity-specific content source relevance score or an entity-specific content source relevance grade associated with the at least one record;
determining whether a market topic identifier associated with the at least one content source record exists in a user query associated with the content segment retrieval operations;
based on the market topic identifier associated with the at least one content source record existing in the user query, retrieving at least one of a topic-specific content source relevance score or a topic-specific content source relevance grade associated with the at least one record; and
based on neither the market entity identifier nor the market topic identifier existing in the user query, retrieving at least one of a standard content source relevance score or a standard content source relevance grade.

23. The method of claim 20, further including:
obtaining a standard content type identifier associated with the at least one content segment;
retrieving at least one content type record from a content type lookup table using the standard content type identifier; and
retrieving at least one of a standard content type relevance score or a standard content type relevance grade associated with the standard content type identifier.

24. The method of claim 20, further including:
returning an incremental content score of zero and a lowest possible incremental content grade based on the syntactic difference score being less than or equal to a selected incremental content threshold score;
performing a semantic comparison operation on the newly-received content segment and on the concatenated content segment to obtain a semantic difference score; and
assigning at least one of an incremental content score and an incremental content grade to the newly-received content segment based upon an amount of content that is both syntactically different and semantically different between the newly received content segment and the concatenated content segment.

25. The method of claim 20, further including:
retrieving a connectedness record from a connectedness metric lookup table using a content segment identifier associated with the at least one content segment;
retrieving a content segment connectedness metric value and a content source connectedness value from the connectedness metric lookup table;
calculating at least one of an obscurity score or an obscurity grade associated with the at least one content segment, wherein the obscurity score comprises a function of the content segment connectedness metric value and the content source connectedness value and wherein the obscurity grade comprises a function of the content segment connectedness metric value and the content source connectedness value;
retrieving at least one specialty topic weighting value from a specialty topic weighting table using at least one specialty topic associated with a user profile and with a source of the at least one content segment based on the at least one specialty topic being associated with the at least one content segment; and
performing a weighting operation on the obscurity score using the at least one specialty topic weighting value.

26. The method of claim 20, further including:
parsing a user query into at least one of an entity, a topic, a keyword, or a key phrase, wherein the user query is used to retrieve the at least one content segment;
retrieving at least one of an entity-indicative keyword or an entity-indicative key phrase from an entity-topic knowledge base (ETK) using the entity;
retrieving at least one of a topic-indicative keyword or a topic-indicative key phrase from the ETK using the topic;
calculating at least one of a set of individual applicability to user query scores or a set of individual applicability to user query grades, wherein at least one of each individual applicability to user query score or each applicability to user query grade is associated with the keyword, the key phrase, the entity-indicative keyword, the entity-indicative key phrase, the topic-indicative keyword, or the topic-indicative key phrase, wherein at least one of each individual applicability to user query score or each applicability to user query grade is based upon at least one of a frequency of occurrence of the keyword, the key phrase, the entity-indicative keyword, the entity-indicative key phrase, the topic-indicative keyword, or the topic-indicative key phrase in the at least one content segment, a prominence of location of the keyword, the key phrase, the entity-indicative keyword, the entity-indicative key phrase, the topic-indicative keyword, or the topic-indicative key phrase in the at least one content segment, a prominence of textual attributes associated with the keyword, the key phrase, the entity-indicative keyword, the entity-indicative key phrase, the topic-indicative keyword, or the topic-indicative key phrase in the at least one content segment, an occurrence of the keyword, the key phrase, the entity-indicative keyword, the entity-indicative key phrase, the topic-indicative keyword, or the topic-indicative key phrase in a picture caption within the at least one content segment, or an occurrence of the keyword, the key phrase, the entity-indicative keyword, the entity-indicative key phrase, the topic-indicative keyword, or the topic-indicative key phrase in anchor text associated with a hypertext transport protocol (HTTP) link pointing to the at least one content segment;
calculating a composite applicability to user query score associated with the at least one content segment, wherein the composite applicability to user query score comprises a mathematical function of the set of individual applicability to user query scores; and calculating a composite applicability to user query grade associated with the at least one content segment, wherein the composite applicability to user query grade comprises a mathematical function of the set of individual applicability to user query scores.

27. The method of claim 20, further including:

identifying at least one of a segment entity, a segment topic, or a segment keyword in the at least one content segment;

querying an impact lookup table for a segment impact metric value associated with the segment entity, a segment impact metric value associated with the segment topic, and a segment impact metric value associated with the segment keyword and retrieving the segment impact metric value associated with the segment entity, the segment impact metric value associated with the segment topic, and the segment impact metric value associated with the segment keyword;

calculating at least one of an overall segment impact score or an overall segment impact grade as a function of the segment impact metric value associated with the segment entity, the segment impact metric value associated with the segment topic, and the segment impact metric value associated with the segment keyword;

parsing a user query into at least one of a query entity, a query topic, or a query keyword, wherein the user query is used to retrieve the at least one content segment;

querying the impact lookup table for a query impact metric value associated with the query entity, a query impact metric value associated with the query topic, and a query impact metric value associated with the query keyword and retrieving the query impact metric value associated with the query entity, the query impact metric value associated with the query topic, and the query impact metric value associated with the query keyword;

calculating at least one of an overall query impact score or an overall query impact grade as a function of the query impact metric value associated with the query entity, the query impact metric value associated with the query topic, and the query impact metric value associated with the query keyword;

calculating a composite impact score as a function of the overall segment impact score and the overall query impact score; and calculating a composite impact grade as a function of the overall segment impact grade and the overall query impact grade.

28. A computer-readable medium having instructions, wherein the instructions, when executed, result in at least one processor performing:

receiving a set of content quality threshold values and a search string at a content quality metric (CQM) apparatus;

receiving a content data stream at the CQM apparatus;

scoring at least one content segment associated with the content data stream according to a set of scorable content relevance scales to achieve a set of relevance scores for the at least one content segment;

grading the at least one content segment according to a set of gradable content relevance scales to obtain a set of relevance grades for the at least one content segment;

filtering the content data stream to include passing content segments and intermediate calculation values used to determine whether a content segment is passing, a content segment defined as passing based on a mathematical function of at least one of the set of relevance scores or the set of relevance grades being related to a mathematical function of a set of content threshold values according to a selected relationship;

determining a subset of previously-received content segments stored in an historical content segment database;

concatenating the subset of previously-received content segments to create a concatenated content segment; and performing a syntactic text comparison of a newly-received content segment to the concatenated content segment to identify portions of the newly-received content segment that are different from the concatenated content segment and to calculate a syntactic difference score.

* * * * *